United States Patent [19]

Rosen

[11] Patent Number: 5,437,420

[45] Date of Patent: Aug. 1, 1995

[54] HIGH TORQUE DOUBLE GIMBAL CONTROL MOMENT GYRO

[75] Inventor: Harold A. Rosen, Santa Monica, Calif.

[73] Assignee: Hughes Aircraft Company, Los Angeles, Calif.

[21] Appl. No.: 93,540

[22] Filed: Jul. 16, 1993

[51] Int. Cl.$^6$ ............................................... B65G 1/28
[52] U.S. Cl. ...................................... 244/165; 74/5.4
[58] Field of Search ...................... 244/164, 165, 79; 74/5.22, 5.4

[56] References Cited

U.S. PATENT DOCUMENTS

| | | | |
|---|---|---|---|
| 3,424,401 | 1/1969 | Maurer | 244/79 |
| 3,795,150 | 3/1974 | Eckhardt | 74/5.4 |
| 3,813,067 | 5/1974 | Mork | 244/165 |
| 4,911,385 | 3/1990 | Agrawal et al. | 244/165 |
| 5,259,577 | 11/1993 | Achkar et al. | 244/165 |

*Primary Examiner*—Galen L. Barefoot
*Attorney, Agent, or Firm*—Terje Gudmestad; Wanda K. Denson-Low

[57] ABSTRACT

A system and related method is provided for rapidly repointing spacecraft through the application of a high torque, of a gyroscope in which braking means (20, 22) provided on a gimbal (16, 18) is actuated simultaneously with the actuation of the torque motor (24, 26) to achieve amplification of the control moment imparted to the gyroscope (10). Because only one brake (20, 22) may be actuated at a time in a double gimbal gyroscope system having a single spin wheel (12), actuation of the brake (20, 22) for each of the two axes is sequential. However in a system having redundant torque motors (24, 26), re-pointing of the spacecraft may be achieved using the simultaneous braking and torque application method of the present invention without increasing the repointing time by applying torque to a gimbal (16) rotating about one axis of the first spin wheel (12) at the same time that torque is applied to a gimbal (18) rotating around the orthogonal axis of the redundant spin wheel (12).

7 Claims, 1 Drawing Sheet

HIGH TORQUE DOUBLE GIMBAL CONTROL MOMENT GYRO

FIELD OF THE INVENTION

The present invention relates to double gimbal control moment gyroscopes used in spacecraft for attitude stabilization. More particularly, the present invention relates to an apparatus and a related method for repointing a spacecraft in which braking means added to both gimbals are actuated simultaneously with the application of torque to the gimbals to achieve amplification of the control moment imparted to the spacecraft.

BACKGROUND ART

Control moment gyroscopes have been in use for many years in both single gimbal and double gimbal versions to control the attitude of spacecraft. The single gimbal control moment gyroscope is advantageous over the double gimbal control moment gyroscope in that the useful output torque applied to the spacecraft by the single gimbal control moment gyroscope can be orders of magnitude greater than the torque applied by the torque motor. The high output torque capability of the single gimbal control moment gyroscope results from the fact that the torque applied from the torque motor in the single gimbal control moment gyroscope design need overcome only the static inertia of the spin wheel to cause the gyroscope to precess.

In contrast to the single gimbal control moment gyroscope, a conventional double gimbal control moment gyroscope provides no torque magnification over that supplied by the torque motor. The conventional double gimbal control moment gyroscope disadvantageously requires impracticality large torque motors to provide high torque control. Thus, a desirable feature of the single gimbal control moment gyroscope design over that of the conventional double gimbal control moment gyroscope is that small torque motors can be used to create large control torques. However, the single gimbal control moment gyroscope system disadvantageously requires two separate devices to provide high torque control along two axes while the conventional double gimbal control moment gyroscope design requires only a single large torque motor. Accordingly, the current design approach to meet high torque control requirements in gyroscope systems uses a multiplicity of single gimbal control moment gyroscopes. Thus, an approach is sought which combines the high torque capabilities of the single gimbal control moment gyroscope with the dual-axis control of the double gimbal control moment gyroscope.

SUMMARY OF THE INVENTION

The present invention involves a modification of the conventional double gimbal control moment gyroscope design which provides the high torque magnification characteristic of the single gimbal control moment gyroscope design.

Thus, according to one aspect of the present invention, a method is provided for repointing a spacecraft using the gimbals of a double gimbal control moment gyroscope involving sequentially applying a control torque to each of two gimbals about their respective axis while simultaneously applying a braking force to the orthogonal gimbal about its axis, the application of the braking forces reacting against the gimbal to thereby enhance the effect of the control torques on the spacecraft.

According to another aspect of the present invention, a double gimbal control moment gyroscope is described having first and second interconnected gimbals, a rotating inertial member mounted on one of the gimbals, first braking means for applying a first braking force to the first gimbal and second braking means for applying a second braking force to the second gimbal, such that application of braking forces amplifies the control moment exerted by the rotating member on the spacecraft.

Other objects, features and advantages will become clear or will be made apparent during the course of the following description of the preferred embodiment of the present invention.

DETAILED DESCRIPTION OF THE PREFERRED EMBODIMENTS

Figure 1:
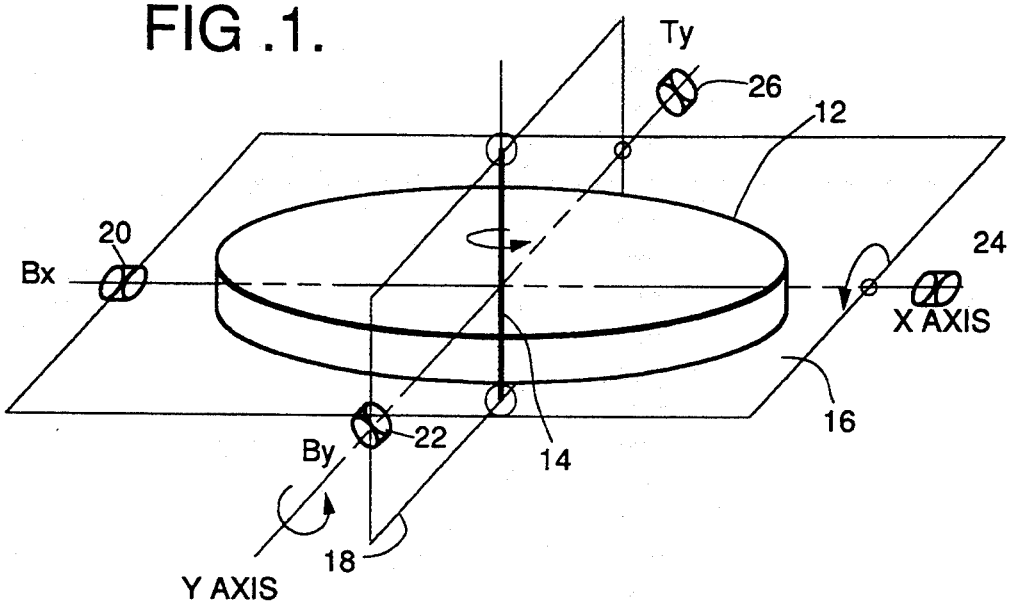
FIG. 1 is a perspective view of a high torque control moment gyroscope which forms the preferred embodiment of the present invention.

Referring now to the drawings wherein like reference numerals are used to identify identical components in various views, FIG. 1 depicts a double gimbal control moment gyroscope system generally indicated by the numeral 10 which includes a spinning rotor, referred to as a spin wheel 12, which spins about spin axis Z. Once the spin wheel 12 is set in motion, the inertia of the spinning wheel 12 tends to resist any attempt to change its direction of rotation regardless of how the support of the spin wheel 12 moves about, a property which makes the gyroscope system 10 useful in guiding satellites and space vehicles.

The central shaft 14 of the spin wheel 12 is mounted on an x gimbal 16 which rotates about the x coordinate axis. The x gimbal 16, in turn, is mounted on a y gimbal 18 which rotates about the y coordinate axis. As shown in FIG. 1, both the x gimbal 16 and the y gimbal 18 are perpendicular to each other and to the spin axis Z which is aligned in the direction of the z coordinate axis. This standard configuration of x and y gimbals 16 and 18, respectively, takes advantage of a property of gyroscopes called precession. Precession is the tendency of a spinning body to move at right angles to the direction of any force that attempts to change its direction of rotation.

In the present invention, an electromagnetically operated gimbal brake $B_x$ 20 is added to the x gimbal 16 to provide a means for braking or impeding the rotation of the x gimbal 16 about the x axis. In a similar manner, an electromagnetically operated gimbal brake $B_y$ 22 is provided on the y gimbal 18 and acts as a means for braking or impeding the rotation of the y gimbal 18 about the y axis. X torque motor 24 provided on the x gimbal 16 acts as a means for applying a torque to the x gimbal 16. In a similar manner, Y torque motor 26 provided on the y gimbal 18 acts as a means for applying a torque to the y gimbal. X and Y torque motors 24 and 26 are the standard control moment devices provided as part of any double gimbal control moment gyroscope system 10.

According to the present invention, a high torque or amplified control moment about either the x or y axis can be created by simultaneously exciting or actuating both the X or Y torque motor 24 or 26, respectively, and the orthogonal X or Y gimbal brake $B_x$ 20 or $B_y$ 22, respectively. For example, application of a torque $T_x$ to the x gimbal 16 by exciting the X torque motor 24 while at the same time actuating or locking Y gimbal brake $B_y$ 22 results in the creation of an amplified control moment transmitted to the x gimbal 16 through the locked gimbal brake $B_y$ 22 causing x gimbal 16 to rotate about the x axis. Thus, in this example, instead of allowing the y gimbal 18 to precess freely about the y axis as would be the case if a torque $T_x$ were applied to the x gimbal 16 of a standard gyroscope, simultaneous actuation of an the X torque motor 24 and y gimbal brake $B_y$ 22 imparts a high torque through Y gimbal brake $B_y$ 22 to the spacecraft. A control moment about the y axis is similarly created by simultaneously exciting the Y torque motor $T_y$ 26 and the X gimbal brake $B_x$ 20. Thus, the present invention produces two large orthogonal torques through the use of two small torque motors and a single gyro.

Any small nutational motion created by control transients which still exist after the high torque double gimbal control moment gyroscope system 10 has reached its new pointing direction may be damped using the normal low torque mode of the gyroscope system 10, i.e., X or Y torque motor 24 or 26, respectively, is actuated while both X and Y brakes $B_x$ 20 and $B_y$ 22, respectively, remain unlocked.

In a single gyroscope system 10, amplified control moments or torques such as those produced by the double gimbal control moment gyroscope system 10 of the present invention are available sequentially but not simultaneously. This outcome results from the fact that only one brake, $B_x$ 20 or $B_y$ 22, can be actuated at a time. Sequential actuation of the electromagnetically actuated brakes $B_x$ 20 and $B_y$ 22 can increase the time required to re-point the gyroscope system 10 by 41% as compared to a conventional double gimbal control moment gyroscope system in which simultaneous application of torque to both gimbals is possible. However, in the event that a second gyroscope system 10 is provided for redundancy, the x axis of the first gyroscope system and the y axis of the second gyroscope system may be controlled simultaneously to recover the 41% increase in re-pointing time. In such a redundant gyroscope system configuration, sequential actuation of the X and Y brakes $B_x$ 20 and $B_y$ 22, respectively, as outlined above provides a backup mode in the event of that one the redundant gyroscope systems 10 fails.

Figure 2:
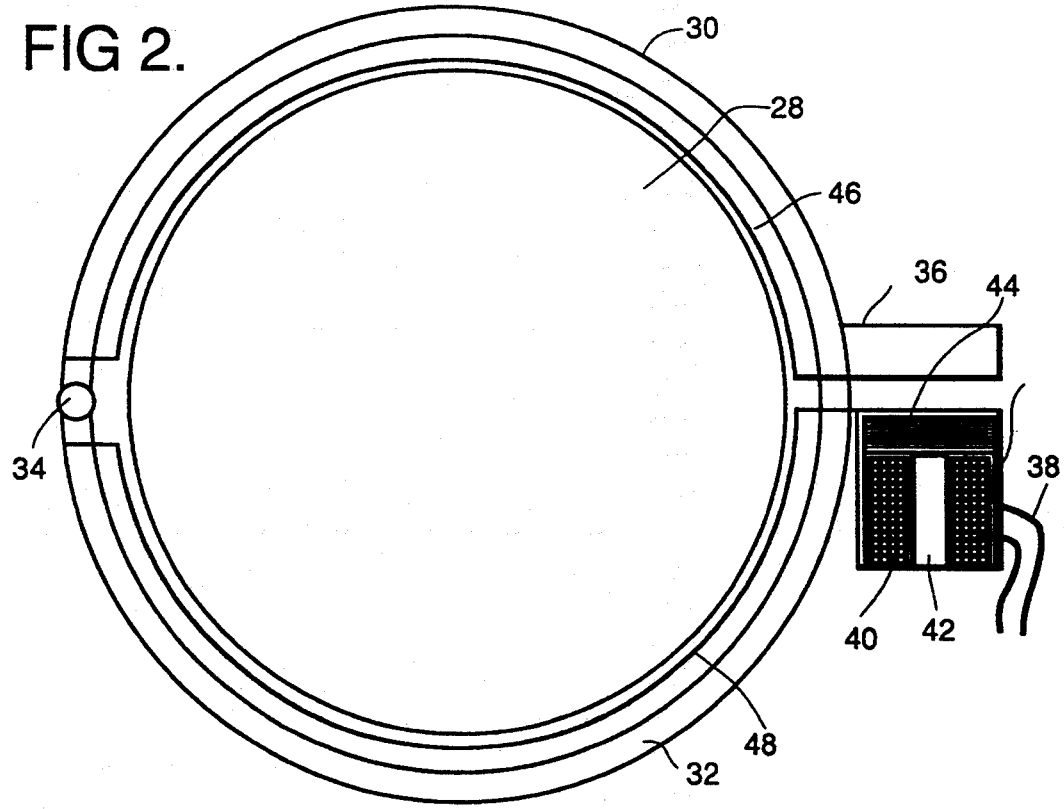
FIG. 2 is a perspective view of the X axis gimbal brake $B_x$ shown in FIG. 1.

FIG. 2 depicts X gimbal brake $B_x$ 20, embodied representatively as an electromagnetic gimbal brake. X gimbal shaft 28 is surrounded by upper and lower brake shoes 30 and 32 which are hinged together at spring 34. Attached to upper brake shoe 30 is dipole piece 36. Attached to lower brake shoe 32 is electromagnet 38 which comprises a coil 40 surrounding a core 42 and a non-magnetic coil plate 44. When electric current flows through the coil 40, an magnetic field is created pulling dipole piece 36 toward the coil plate 44, thereby clamping brake shoes 30 and 32 around X gimbal shaft 28. Brake shoes 30 and 32 contact X gimbal shaft 28 along upper and lower friction surfaces 46 and 48, respectively. The Y gimbal brake $B_y$ 22 can be provided in the same manner as the X gimbal brake $B_x$ 20 just described.

The foregoing detailed description shows that the preferred embodiment of the present invention is well-suited to fulfill the objects of the invention. It is recognized that those skilled in the art could make various modifications or additions to the preferred embodiment without departing from the spirit of the invention. Accordingly, it is to be understood that the invention should be deemed to extend to all fair equivalents thereof.

What is claimed is:

1. A double gimbal control moment gyroscope (10) for controlling the attitude of a spacecraft, comprising:
    first (16) and second (18) interconnected gimbals respectively rotatable about first and second orthogonal axes;
    a momentum wheel (12) rotatable about a third axis orthogonal to each of said first and second axes;
    first torque means (24) for applying a first control torque to said first gimbal (16) about said first axis;
    second torque means (26) for applying a first control torque to said second gimbal (18) about said second axis;
    first braking means (20) for applying a first braking force to said first gimbal (16) to reduce the inertia of said first gimbal (16), the reduction of the inertia of said first gimbal (16) resulting in an amplification of the affect of the control torque applied to said second gimbal (18) by said second torque means (26); and
    second braking means (22) for applying a second force to said second gimbal (18) to reduce the inertia of said second gimbal (18, the reduction of the inertia of said second gimbal (18) resulting in an amplification of the effect of the control torque applied to said first gimbal (16) by said first torque means (24),
    said first torque applying means and said first braking means being mounted on opposite sides of said first gimbal,
    said second torque applying means and said second braking means being mounted on opposite sides of said second gimbal,
    each of said first and second braking means including an electromagnetically operated brake including brakeshoe means for frictionally engaging a corresponding one of said gimbals, and electrically responsive coil means for producing an electromagnetic field urging the brakeshoe means into frictional engagement with the associated gimbal.

2. The double control moment gyroscope of claim 1, wherein:
    each of said brakeshoe means includes first and second brakeshoes, and
    means for pivotally connecting said first and second brakeshoes in clamping relationship around the corresponding gimbal.

3. The double control moment gyroscope of claim 2, wherein:
    each of said gimbals includes a gimbal shaft and the brakeshoes of the associated braking means are disposed around and engagable with said shaft, and said first and second brakeshoes oppose each other,
    said connecting means being secured to one end of said first and second brakeshoes,
    said coil means being secured to the other of said first and second brakeshoes.

4. A method of repointing a platform having at least first and second gimbal control moment gyroscopes, wherein each of said gyroscopes includes first and second interconnected gimbals respectively rotatable about first and second orthogonal axes, comprising the steps of:

(A) applying a first control torque to the first gimbal of the first gyroscope about the first axis of the first gyroscope; and, (B) applying a first braking force to the second gimbal of the second gyroscope about the second axis of the second gyroscope, step (B) being performed while carrying out step (A), the application of said first braking force to the second gimbal of said second gyroscope reacting against the inertia of the first gimbal of the first gyroscope to thereby enhance the effect of said control torque.

5. The method of claim 4, including the steps of:

(C) applying a second control torque to the second gimbal of the second gyroscope about the second axis of the second gyroscope; and (D) simultaneously with step (C), applying a second braking force to the first gimbal of the first gyroscope.

6. The method of claim 4, wherein step (B) is performed by:

energizing an electromagnetic means, and frictionally engaging said second gimbal using said electromagnetic braking means.

7. The method of claim 6, wherein said engaging is performed by clamping a portion of said second gimbal between of pair of brake shoes forming a part of said braking means.

* * * * *